United States Patent [19]

Stache et al.

[11] 4,400,268
[45] Aug. 23, 1983

[54] ARRANGEMENT FOR PILING A BULKY MATERIAL HAVING DIFFERENT GRAIN SIZES

[75] Inventors: Bernd Stache; Dieter Vogt, both of Brunswick, Fed. Rep. of Germany

[73] Assignee: Bühler-Miag GmbH, Brunswick, Fed. Rep. of Germany

[21] Appl. No.: 360,640

[22] Filed: Mar. 22, 1982

Related U.S. Application Data

[63] Continuation of Ser. No. 183,832, Sep. 3, 1980, abandoned.

[30] Foreign Application Priority Data

Sep. 7, 1979 [DE]  Fed. Rep. of Germany ....... 2936198

[51] Int. Cl.³ ............................................. B07B 1/04
[52] U.S. Cl. ................................... 209/236; 209/247; 209/254; 209/353; 209/395; 209/420; 414/133
[58] Field of Search ............... 209/235, 236, 247, 254, 209/281, 352, 353, 233, 240, 241, 243, 244, 253, 255, 263, 264, 311, 377, 373–375, 393–395, 625, 626, 632, 633, 675, 676, 420; 414/133

[56] References Cited

U.S. PATENT DOCUMENTS

| | | | |
|---|---|---|---|
| 639,855 | 12/1899 | Jessup | 209/247 X |
| 708,257 | 9/1902 | Rundell | 209/353 |
| 947,599 | 1/1910 | Ransome | 414/133 X |
| 1,207,262 | 12/1916 | Alwart | 209/240 |
| 1,645,405 | 10/1927 | Shaw | 209/247 |
| 3,221,877 | 12/1965 | Koning | 209/395 X |
| 3,241,671 | 3/1966 | Brauchla | 209/243 |
| 3,416,660 | 12/1968 | Larsson | 209/317 X |
| 3,477,573 | 11/1969 | Andersson | 209/394 X |
| 3,794,164 | 2/1974 | Ginaven | 209/243 |
| 4,132,520 | 1/1979 | De Mets | 209/255 X |

FOREIGN PATENT DOCUMENTS

17829 of 1888 United Kingdom ............... 209/377

*Primary Examiner*—Ralph J. Hill
*Attorney, Agent, or Firm*—Michael J. Striker

[57] ABSTRACT

An arrangement for piling a bulky material of different grain sizes has one central and two lateral passages, a guiding element located upstream of the passages and arranged to guide a flow of a bulky material toward the lateral passages, and grate elements located between the guiding element and a respective one of the passages and arranged so that the fine portion of the material passes through each of the grate elements into a respective one of the lateral passages, whereas the coarse grain portion of the material is guided over the grate elements so as to pass into the central passage.

14 Claims, 2 Drawing Figures

ARRANGEMENT FOR PILING A BULKY MATERIAL HAVING DIFFERENT GRAIN SIZES

This is a continuation of application Ser. No. 183,832, filed Sept. 3, 1980.

BACKGROUND OF THE INVENTION

The present invention relates to an arrangement for piling bulky materials having different grain sizes.

Arrangements of the above mentioned general type are known in the art. It is frequently needed to provide for a homogeneous piling inasmuch as during removing of the pile in order to deliver the piled material to the manufacturer, a substantial uniform raw material is required to avoid variations in the quality of the end products. An arrangement for piling bulky materials of different grain sizes, provides for a prehomogenization of the stream of the material to be piled is disclosed for example in the German Offenlegungschrift No. 2,342,122 and German Pat. No. 478,979. This arrangement includes a chute which separates the stream into three partial streams. When the arrangement in accordance with the German Offenlegungschrift No. 2,342,122 is utilized, the pile is formed which has three spread partial streams each composed of coarse material in the supply distribution. The pile has thereby three ridges below which regions with fine material are formed, whereas between and laterally of the same, regions of coarse material are located. Even though this arrangement provides basically for a sufficient quality of homogenization, this arrangement possesses the disadvantage in that it has a relatively narrow limited piling height as compared with the one ridge piles of the same base width.

SUMMARY OF THE INVENTION

Accordingly, it is an object of the present invention to provide an arrangement for piling bulky materials having different grain sizes, which avoids the disadvantages of the prior art.

More particularly, it is an object of the present invention to provide an arrangement for piling materials having different grain sizes, with which with the same or smaller expenses, a greater piling height can be obtained as compared with the known arrangements, and at the same time massing of the coarse material in the region of the bottom of the pile which reduces the quality of the homogenization is avoided.

In keeping with these objects and with others which will become apparent hereinafter, one feature of the present invention resides, briefly stated, in an arrangement which has means forming three passages with one passage located centrally and two passages located laterally outwardly, guiding means located upstream of the passages and arranged to guide a flow of a bulky material toward the lateral passages, and separating means including grate elements each located between the guiding means and the respective one of the passages and arranged so that the fine portion of the material passes through each of the grate elements in a respective one of the lateral passages, whereas the coarse grain portion of the material is guided over the grate elements so as to pass into the central passage.

The passage forming means may have a common inlet arranged to be located below a dropping point of a conveyor. The guiding means may include a saddle-like chute having two inclined portions each arranged to guide the flow of the bulky material toward a respective one of the lateral passages.

The passages forming means may include an outer wall formed as a hopper, and two inner walls each formed as an insert in the hopper. The above-mentioned lateral passages are formed between the inner walls and the outer wall, whereas the central passage is formed inside the inner walls.

The grate elements may be fixedly connected with the hopper and a respective one of the inserts. On the other hand, they may be connected only to one of these elements. For example, one end portion of each grate element may be fixedly connected with the hopper, whereas the other end portion of the same can swing freely. It is also possible that one end portion of each of the grate elements is fixedly connected with a respective one of the inserts, whereas the other end portion of the same swings freely.

Each of the grate elements may be composed of a plurality of members which are oriented in accordance with the direction in which the bulky material flows from the guiding means to the respective grate element. The members may be formed as round bars.

Finally, the grate members may be arranged so that the distance between them and the inclination of these members are variable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
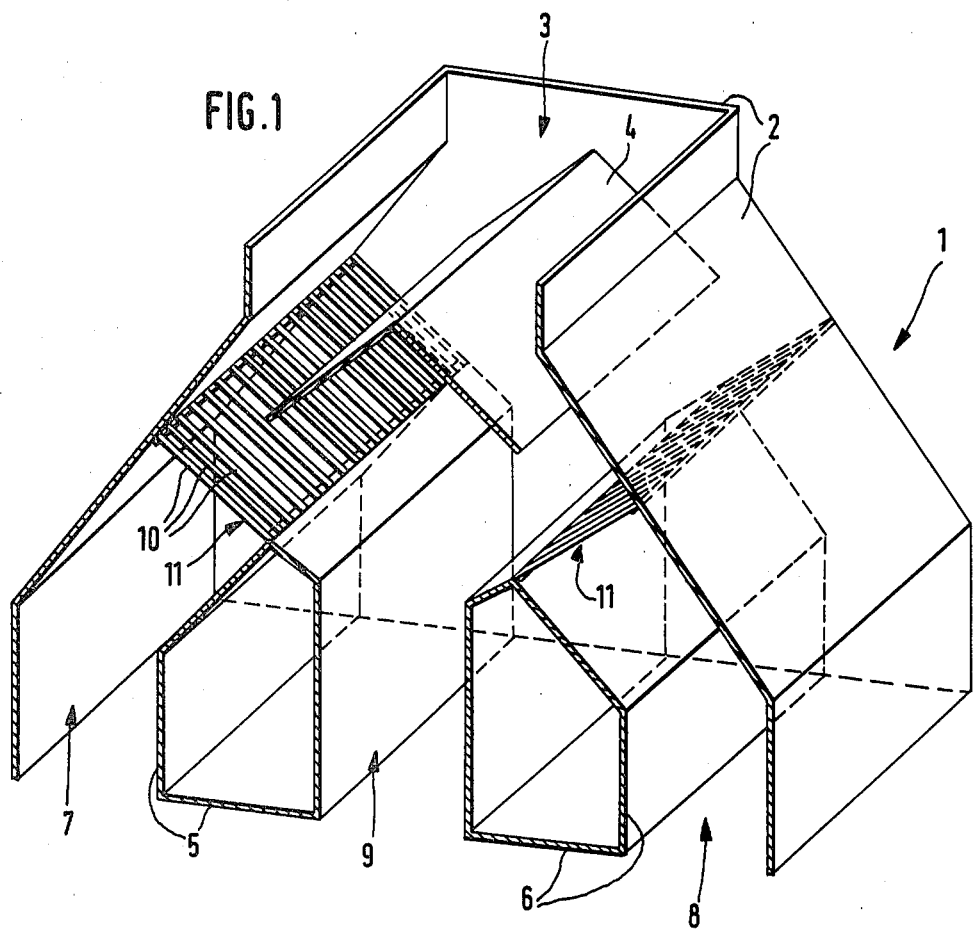
FIG. 1 is a perspective view showing an arrangement for piling bulky materials in accordance with the present invention.

An arrangement for piling a bulky material having different grain sizes is identified in toto by reference numeral 1. It comprises an outer wall which is formed as a hopper or funnel 2. The latter can be composed of a plurality of sheets which are welded to one another.

Reference numeral 3 identifies an inlet of the arrangement which is located below a drop point of a not shown conveyor. A guiding element is arranged in the region of the inlet 3. The guiding element is formed as a saddle chute 4 having two portion inclined relative to one another.

The hopper 3 has an upper part in which the inlet 3 and the saddle chute 4 are arranged, and a lower part. The lower part of the hopper 3 is subdivided into three outlet passages 7, 8, and 9 by two welded inserts 5 and 6. The outer outlet passages 7 and 8 are formed between one of the inserts 5 and 6 and the hopper 2. The passage 9 is formed between the inner inserts 5 and 6.

Means for separating a coarse portion of the material from a fine portion of the material is further provided. This means includes separating grate elements 11 which are located upstream of the outer passages 7 and 8. The separating grate elements 11 may be composed of a plurality of round bars 10 which are spaced from one another so as to form gaps therebetween.

The separating grate elements extend between the hopper 2 and the inserts 5 and 6 and are fixedly connected to the same, as can be seen from FIG. 1. However, the separating grate elements may be connected to only one of these elements. As can be seen from FIG. 2, each of the separating grate elements 11 is fixedly connected to the hopper 2 by one end portion of the former. The other end portion of each separating grate element swings freely. Thereby, the separating grate elements possess springy properties which facilitate their self-cleaning.

It is to be understood that the separating grate elements may be arranged in another manner. More particularly, the members 10 of the separating grate elements 11 may be welded not to the hopper 2, but to the insets 5 and 6. In this case, the above-mentioned springy action is also attained. The members 10 are inclined and spaced from one another in correspondence with the respective bulky material.

The bulky material 13 is transported by a belt conveyor 12 toward the arrangement. The stream of the material 13 which is discharged from the belt conveyor 12 enters the inlet 3 of the hopper 2 and is quantitatively separated by the saddle chute 4 so that one half of the stream is supplied to a respective one of the separating grate elements 11. The members 10 of the elements 11 are spaced from one another so that a fine portion 14 of the bulky material unobjectionably passes through the separating grate elements into the lateral passages 7 and 8. A coarse portion 15 of the bulky material 13, however, displaces over the grate elements 11 and passes into the central passage 9.

Figure 2:
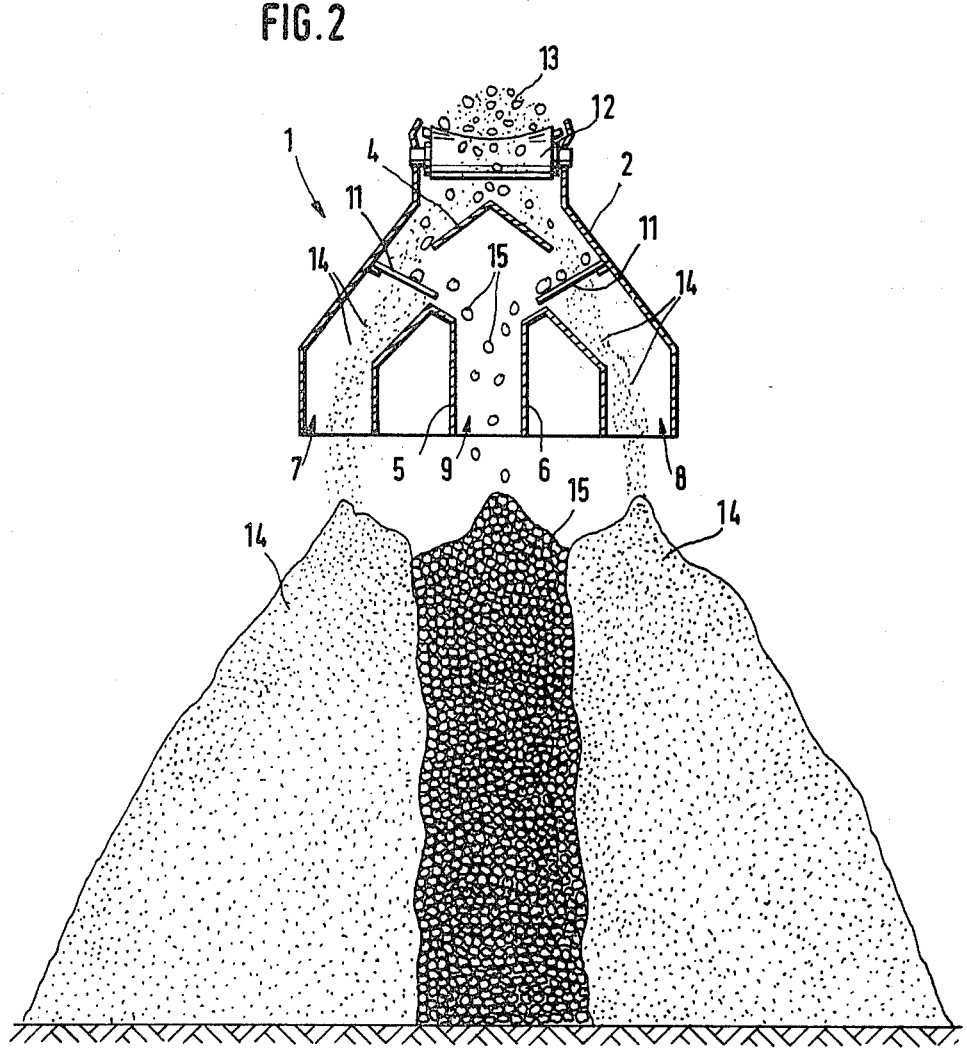
FIG. 2 is a side view of the arrangement in section.

As can be seen from FIG. 2, the pile formed by the inventive arrangement has a central zone and two lateral zones. The central zone is composed of a coarse grain material 15, whereas two outer zones are composed of fine grain material 14. In contrast to the known piling arrangements, the inventive arrangement forms the coarse portion of the material in the pile center and this portion can be built up to the pile ridge, as well as the fine grain portion.

Such a pile has the considerable advantage for removal with the aid of a material removing tool in that it has at each height approximately identical cross section of the delivered material. The improved homogeneity of the bulky material provides for considerably favorable condition for its subsequent working.

As mentioned above, the separating grade elements are variable and thereby the arrangement is suitable for piling bulky materials of any grain size. The separating grade elements may be modified in their dimensions and special construction in a relatively simple manner, whereby it can be suitable for each application case or for any supply conveyor.

It will be understood that each of the elements described above, or two or more together, may also find a useful application in other types of constructions differing from the types described above.

While the invention has been illustrated and described as embodied in an arrangement for piling bulky materials of different grain sizes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method of piling a bulky material which has different grain sizes, comprising the steps of guiding a flow of bulky material downwardly by guiding means; providing at least three passages including a central passage and two laterally adjacent passages located at opposite sides of said central passage; and separating the flow of bulky material by separating means located substantially below said guiding means and above said pile forming means, and including grate elements arranged so that the fine grain portions of the bulky material pass through said grate elements into and through a respective one of said lateral passages, whereas the coarse grain portion of the bulky material is guided over said grate elements to pass into and through said central pasage; and forming a pile having at least one central pile zone composed of the coarse grain portion of the bulky material, and two lateral pile zones composed of the fine grain portions of the bulky material.

2. An arrangement for piling a bulky material which has different grain sizes and is supplied from above downwardly, comprising guiding means arranged to guide a flow of a bulky material downwardly; pile forming means including at least three passages with one passage located centrally and two other passages located laterally adjacent to said central passages at opposite sides of the latter; separating means located substantially below said guiding means and above said pile forming means and arranged to separate the flow of the bulky material into at least one coarse grain portion and two fine grain portions, said separating means including grate elements arranged so that the fine grain portions of the bulky material pass through said grate elements into and through a respective one of said lateral passages, whereas the coarse grain portion of the bulky material is guided over said grate elements to pass into and through said central passage so as to form a pile having at least one central pile zone composed of the coarse grain portion of the bulky material, and two lateral pile zones composed of the fine grain portions of the bulky material.

3. An arrangement as defined in claim 2, wherein said guiding means includes a saddle-like chute having two inclined portions each arranged to guide the flow of the bulky material toward a respective one of said lateral passages.

4. An arrangement as defined in claim 2, wherein said passages forming means includes an outer wall and two inner walls arranged so that each of said lateral passages is formed between said outer wall and one of said inner walls, whereas said central passage is formed inwardly of said inner walls.

5. An arrangement as defined in claim 4, wherein each of said grate elements extends between said outer wall and a respective one of said inner walls bounding a respective one of said lateral passages.

6. An arrangement as defined in claim 4, wherein said outer wall is formed as a hopper.

7. An arrangement as defined in claim 6, wherein each of said inner walls is formed as an insert in said hopper.

8. An arrangement as defined in claim 7, wherein each of said grate elements is fixedly connected with said hopper and a respective one of said inserts.

9. An arrangement as defined in claim 7, wherein each of said grate elements has two end portions spaced from one another, one of said end portions of each of said grate elements being fixedly connected with said hopper, whereas the other end portion of the same can swing freely.

10. An arrangement as defined in claim 7, wherein each of said grate elements has two end portions spaced from one another, one of said end portions of each of said grate elements being connected with a respective one of said inserts, whereas the other end portion of the same swings freely.

11. An arrangement as defined in claim 2, wherein said members of said grate elements are round bars.

12. An arrangement as defined in claim 2, wherein the bulky material flows from said guiding means toward each of said grate elements in a predetermined direction, each of said grate elements being composed of a plurality of members which are oriented in accordance with the direction in which the bulky material flows from said guiding means to the respective grate element.

13. An arrangement as defined in claim 11, wherein said members of each of said grate elements are arranged so that the distance between and the inclination of said members are variable.

14. An arrangement for piling a bulky material which has different grain sizes and is supplied from above downwardly, comprising a conveyor for conveying a bulky material with different grain size and having a discharge end; and a piling device suspended on said discharge end of said conveyor and including guiding means arranged to guide a flow of a bulky material downwardly; pile forming means with at least three passages with one passage located centrally and two other passages located laterally adjacent to said central passages at opposite sides of the latter, and separating means located substantially below said guiding means and above said pile forming means and arranged to separate the flow of the bulky material into at least one coarse grain portion and two fine grain portions, said separating means including grate elements arranged so that the fine grain portions of the bulky material pass through said grate elements into a respective one of said lateral passages, whereas the coarse grain portion of the bulky material is guided over said grate elements to pass into said central passage so as to form a pile having at least one central pile zone composed of the coarse grain portion of the bulky material, and two lateral pile zones composed of the fine grain portions of the bulky material.

* * * * *